(12) United States Patent
Sturt

(10) Patent No.: US 7,401,831 B2
(45) Date of Patent: Jul. 22, 2008

(54) SLIDABLE FLOOR CONSOLE

(75) Inventor: Alan Sturt, West Bloomfield, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 23 days.

(21) Appl. No.: 11/532,961

(22) Filed: Sep. 19, 2006

(65) Prior Publication Data

US 2008/0067828 A1    Mar. 20, 2008

(51) Int. Cl.
*B60N 3/12* (2006.01)

(52) U.S. Cl. .................. 296/37.8; 296/24.34; 224/539; 224/275

(58) Field of Classification Search .............. 296/37.8, 296/24.1, 24.34, 37.1, 37.14; 224/281, 539, 224/540
See application file for complete search history.

(56) References Cited

U.S. PATENT DOCUMENTS

| | | | |
|---|---|---|---|
| 5,338,081 A | 8/1994 | Young et al. | |
| 6,135,529 A * | 10/2000 | De Angelis et al. | 296/37.8 |
| 6,203,088 B1 | 3/2001 | Fernandez et al. | |
| 6,851,736 B1 | 2/2005 | Klopp, III et al. | |
| 6,921,118 B2 | 7/2005 | Clark et al. | |
| 2002/0139824 A1 | 10/2002 | Panhelleux et al. | |
| 2005/0242604 A1 | 11/2005 | Bonnes et al. | |
| 2006/0022478 A1 | 2/2006 | DeLong et al. | |

FOREIGN PATENT DOCUMENTS

| WO | 2005058630 A1 | 6/2005 |
|---|---|---|
| WO | 2005063528 A1 | 7/2005 |

* cited by examiner

*Primary Examiner*—Joseph D Pape
(74) *Attorney, Agent, or Firm*—Brooks Kushman P.C.

(57) ABSTRACT

A storage console configured to slide within a track. The storage console suitable for use in any number of environments, such as but not limited to automotive vehicles. The track being suitable to permit movement of the console from one end to the other, such as but not limited to facilitate movement of the console between multiple rows of vehicle seats.

20 Claims, 5 Drawing Sheets

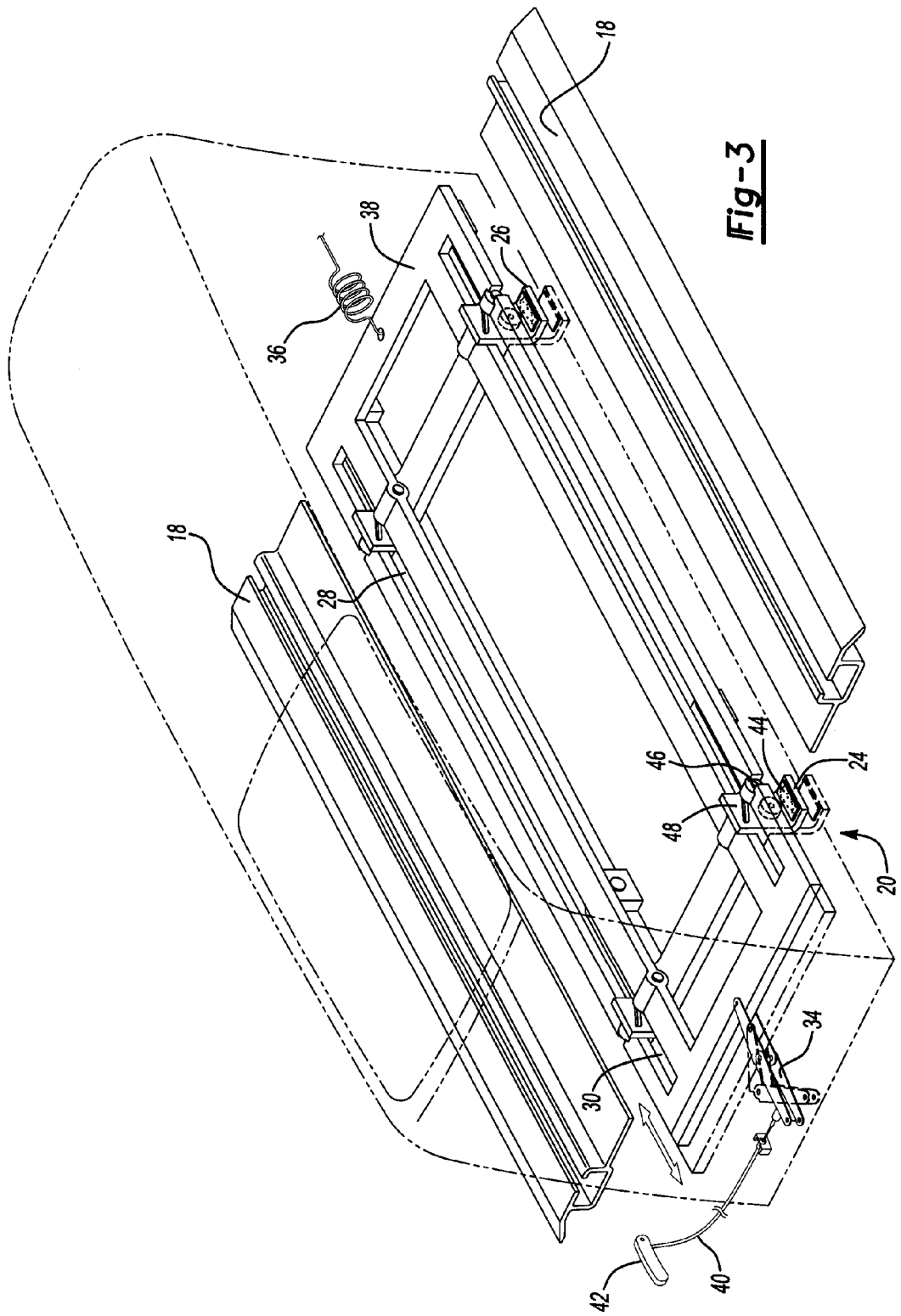

SLIDABLE FLOOR CONSOLE

BACKGROUND OF THE INVENTION

1. Field of the Invention

The present invention relates to slideable floor consoles of the type suitable for use in vehicles.

2. Background Art

Vehicles typically include any number of storage areas for storing items, such as but not limited to map pockets, seat pockets, overhead compartments, center consoles, etc. Many of these consoles are affixed within the vehicle such that they are not easily moveable from one location to the next. Some vehicle layouts, such as but not limited to those associated with multiple rows of seating, may be suitable for use with moveable consoles.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIGS. 2-3 illustrates a console in accordance with one non-limiting aspect of the present invention;

DETAILED DESCRIPTION OF THE PREFERRED EMBODIMENT(S)

Figure 1:
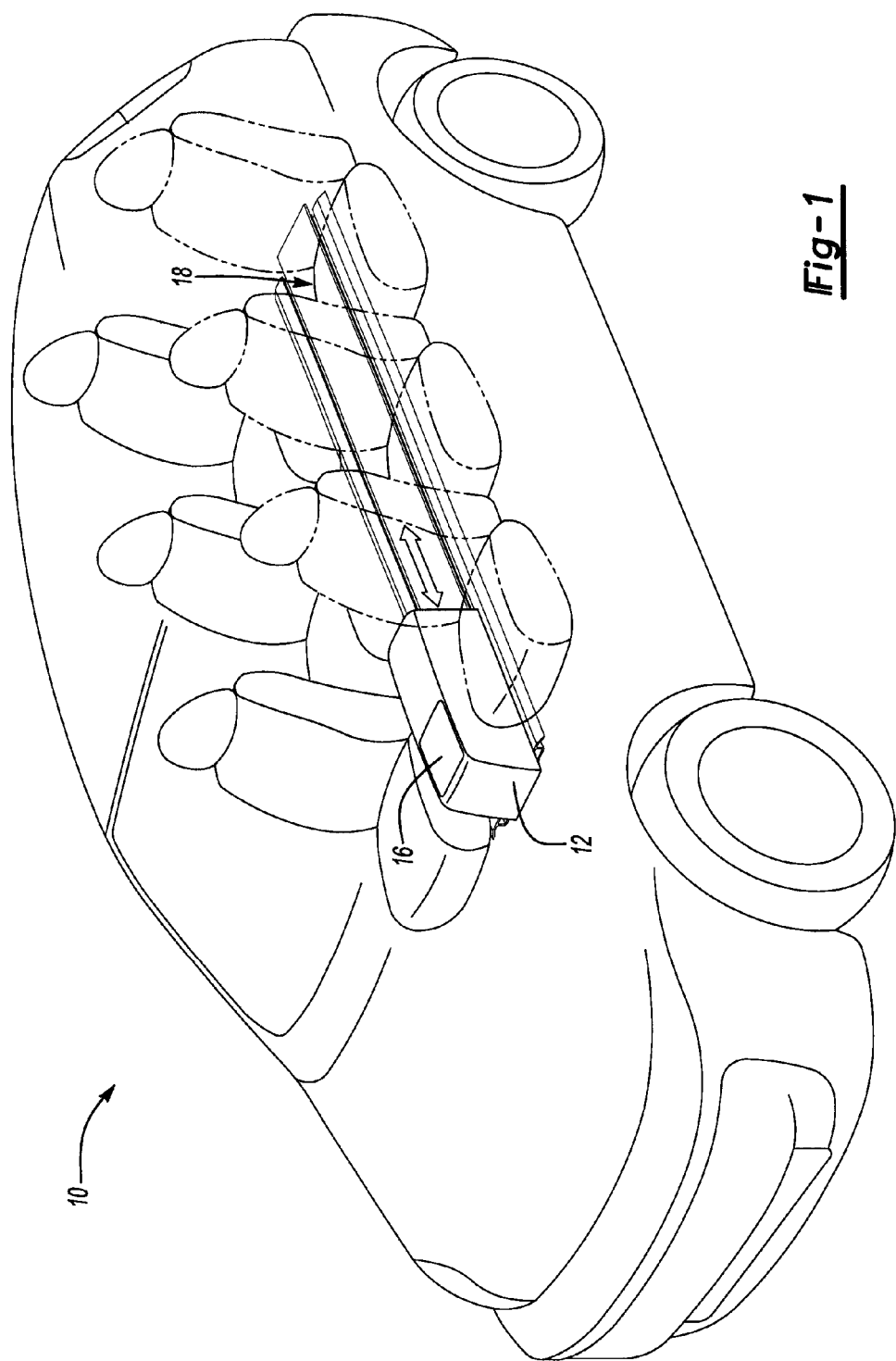
FIG. 1 illustrates a vehicle having multiple rows of seating in accordance with one non-limiting aspect of the present invention.

FIG. 1 illustrates a vehicle 10 having multiple rows of seating in accordance with one non-limiting aspect of the present invention. The illustrated vehicle is shown for exemplary purposes as a minivan and without intending to limit the scope and contemplation of the present invention. The present invention fully contemplates its use in any number of vehicles, including but not limited to other automobiles, watercraft, aircraft, etc.

The vehicle may include a console 12 for storing items therein. The console 12 may include an internal cavity (see FIG. 2) accessible upon opening a corresponding covering top 16. The console 12 is shown for exemplary purposes only and may include any number of other features for storing items, both inside and outside of the illustrated cavity and cover.

The console 12 may be arrangement with respect to a track 18 that extends between multiple rows of seats. As described below in more detail, the console 12 may be affixed within the track 18 and slid back and forth between the various rows of seats. This allows the present invention to provide a moveable console 12 that may be easily accessed by multiple rows of passengers.

Optionally, the console 12 may be slid between the rows without requiring its removal from the tracks. This may be advantageous in facilitating movement of the console 12 as the operator is not required to lift the console 12 and replace it elsewhere in the vehicle while also allowing the console 12 to be easily shift from one location to another. In the event of a vehicle impact, the console 12 also may be restrained by the track 18 such that it is unable to become a dangerous flying object.

The track 18 may include a relatively low profile and/or be recessed with the vehicle floor. This may allow the console 12 to appear as if it slides within the flooring or carpeting associated with the same. The track may further include an overhanging element or other moveable element extending across the topside thereof so as to facilitate hiding the track openings. These elements may be moveable in response to movement of the console 12.

The console 12 may be installed or otherwise loaded within the track during a portion of the vehicle assembly process from an open (probably rear) end of the track before an end cover is installed. Once the end cover is inserted, and optionally carpeting or the like is installed, the console 12 may not be removed from the track without disassembly of the console 12 and/or removal of the end cover.

Figure 2:
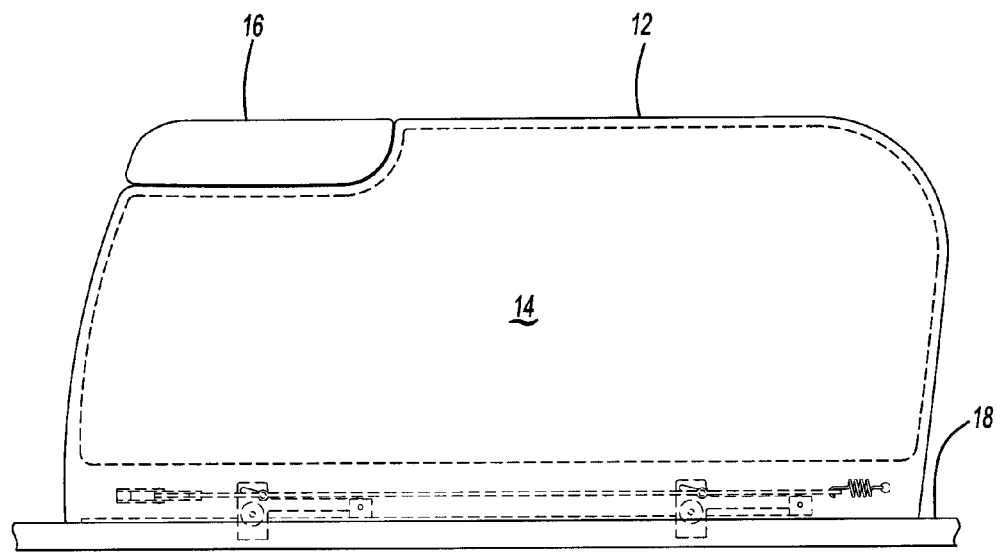

FIGS. 2-3 illustrates the slideable console 12 in accordance with one non-limiting aspect of the present invention. The console 12 may include a locking mechanism 20 to facilitate securing the console 12 relative to the track 18. The locking mechanism 20 generally includes four clamps 24-30 operating in conjunction with forward and rearward springs 34-36 to apply pressure to an underside of the track 18.

The pressure between the clamps 24-30 and track 18 may be sufficient to generate a friction brake between the track 18 and console 12 to prevent or substantially prevent movement of the console 12 under most operating conditions. During accidents or other high force impacts, the frictional force may be overcome and the console 12 may slid along the track 18. This may be helpful in preventing injuries or other damage to an element contacting the console 12.

The locking mechanism 20 may be connected to a shuttle plate 38 configured to ride within the side walls of the console 12. The shuttle plate 38 may be free to move laterally within the console 12 in a forward and rearward direction. The forward and rearward springs 34-3 6 may attach relative to lateral ends of the shuttle plate 38 and corresponding ends of the console 12 to bias the shuttle plate 38 to a position suitable for locking the locking mechanism 20.

The forward spring 34 may be a scissor type spring having a cable 40 connecting to a handle 42 on the console 12. As illustrated with the phantom movement of the spring 34 and the shuttle plate 38, the handle 42 may be retracted to move the spring between an open and closed position, which respectively coincide with the locking mechanism 20 being in a locked and unlocked position. The unlocked position is shown in phantom form and the locked position is shown in solid form. In this manner, the forward movement of the shuttle plate 38 unlocks the locking mechanism so that the console 12 may be easily slid within the track 18 and the rearward movement locks the locking mechanisms to secure the console 12 relative to the track 18.

The scissor spring 34 may be biased to move from the closed position to the open position such that the scissor spring 34 cooperates with the rearward spring 36 to pull the forwardly positioned shuttle plate 38 rearwardly to the locked position. Once so position, the locking mechanism 20 is again locked to secure position of the console 12 within the track 18. This allows the present invention to facilitate movement of the console 12 along the track 18, and optionally between the different rows of seats, by pulling and releasing the handle.

The use of the manually actuated handle 42 is merely one embodiment of the present invention and is shown without intending to limit the scope and contemplation of the present invention. The present invention fully contemplates the use of any number of mechanical, electrical, and/or electro-mechanical items and features to facilitate moving the shuttle plate 38 and/or individually or collectively locking and unlocking the lever clamps 24-30.

Furthermore, the present invention fully contemplates a lock, restraint, or other feature to hold the shuttle plate 38 and/or the handle 42 in the unlocked position so as to permit the console 12 to be slide to another location along the track 18 without requiring constant manual retraction of the shuttle 38.

Figure 4A:
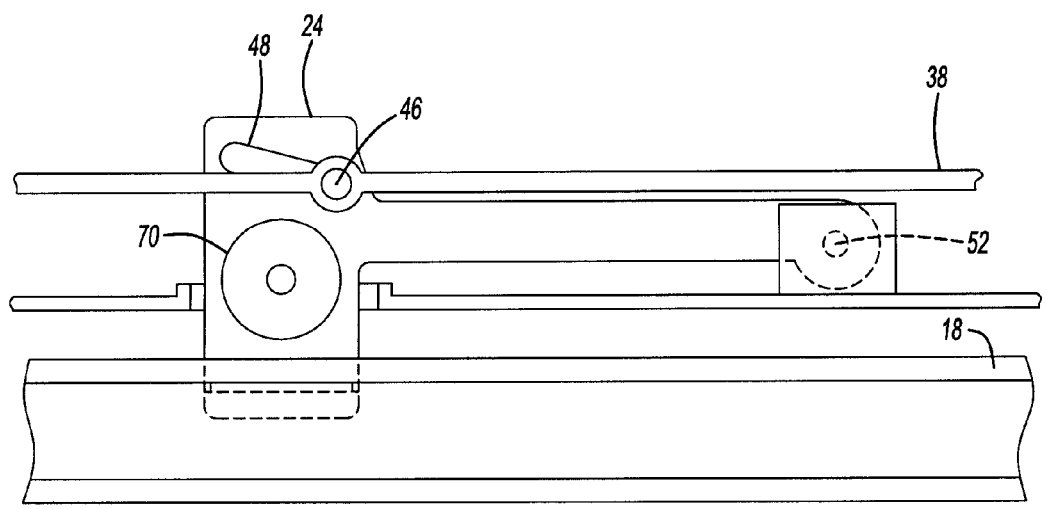
FIGS. 4a-4b illustrate a more detailed view of a locking mechanisms in a locked position in accordance with one non-limiting aspect of the present invention.
Figure 4B:
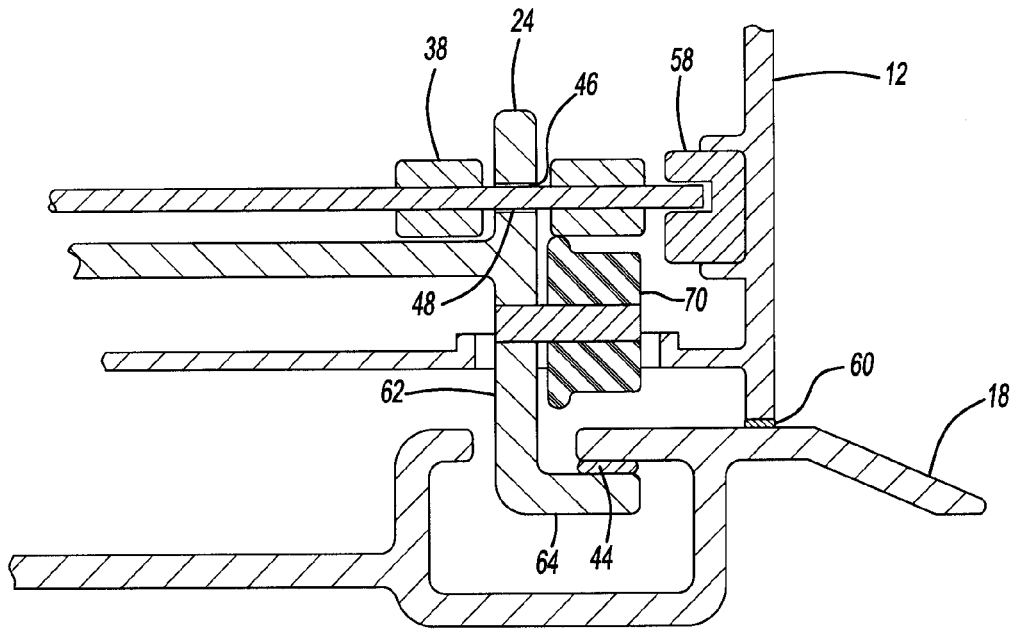

FIGS. 4*a*-4*b* illustrate a more detailed view of one clamp 24 of the locking mechanism 20 in a locked position in accordance with one non-limiting aspect of the present invention. The lever clamp 24 is shown in the locked position such that a pad 44 attached to the topside is pressed against the underside of the track 18. The forced applied to the underside of the track 18 is preferably sufficient to secure positioning of the console 12 relative to the track 18.

The spring forces applied to the shuttle plate 38 may be used to bias the lever clamp 24 against the underside of the track 18. The shuttle plate may include a pin 46 configured to engage an angled ramp 48 at the topside of the lever clamp 24. The ramp 48 may be angled such that the rearward movement of the shuttle plate 38 cause the lever clamp 24 to travel to a bottom portion of the ramp 48, thereby causing the lever clamp to engage the bottom side of the track 18.

One end of the lever clamp 24 may be journaled in a pivot 52 attached to the console 12 such that it is free to rotate with movement of the shuttle plate 18. This configuration allows the locking mechanism 20 components to be secured to the console 12 such that only the shuttle plate 38 moves laterally within the console 12 to cause the lever clamp 24 to move vertically. As shown in FIG. 4*b*, the console 12 may include a guide block 54 to guide the moving shuttle plate 38.

The lever clamp 24, as described above, is biased with the forward and rearward springs 34-36. This, however, is only one aspect of the present invention and the present invention fully contemplates the use of other elements in biasing the lever clamp 24, such as but not limited to spring biasing of the lever pivot 52 such that the lever clamp 24 is biased to the locked position.

The sides of the console 12 may rest against the topside of the track 18. This may help restrain movement of the console 12 relative to the track 18. Friction pads 60 may be optionally attached to the bottom sides of the console 12 so as to further facilitate the frictional connection to the track 18. The flush mounting and extension of the lever clamp 24 within the underside of the track 18 may facilitate aesthetic appeal by concealing the locking mechanism from view. If carpet or other material overlays the track, the console 12 may abut the covering and present the illusion that it is permanently affixed to the flooring.

The lever clamp 24 may include a vertically extending portion 62 and a laterally extending portion 64. The friction pad 44 may be attached to the laterally extending portion 64 and positioned under the track 18 with the vertically extending portion 62 such that the pad 44 extend under the underside of the track 18. The track 18 may include a c-shaped portion configured to receive the laterally extending portion 62 so as to facilitate the pad 44 contacting the underside of the track 18. This arrangement may also be helpful in securing the console 12 within the track 18, which can be helpful in preventing the console 12 from tipping over or otherwise being removed from the track 18.

Figure 5A:
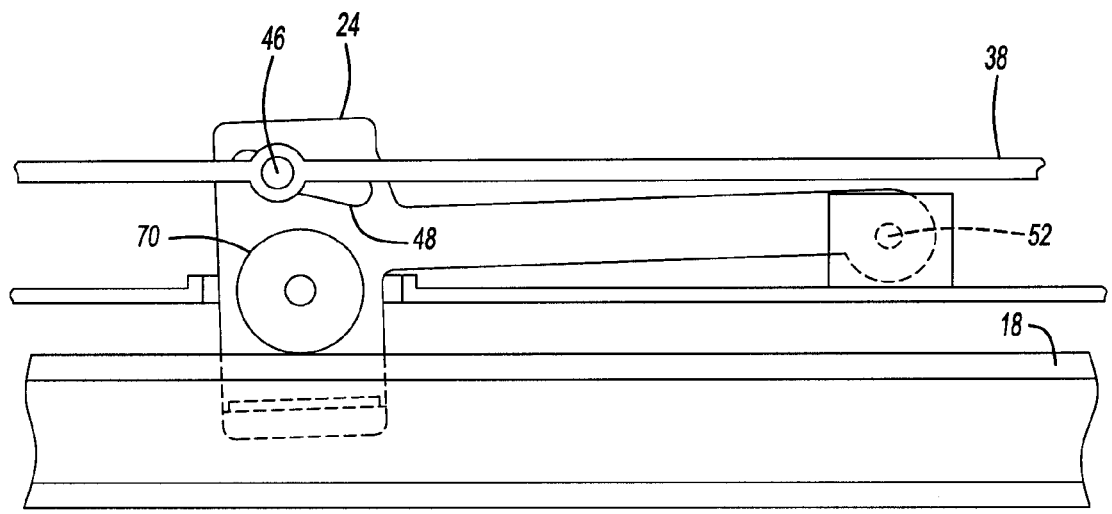
FIGS. 5a-5b illustrate a more detailed view of the locking mechanism in an unlocked position in accordance with one non-limiting aspect of the present invention.
Figure 5B:
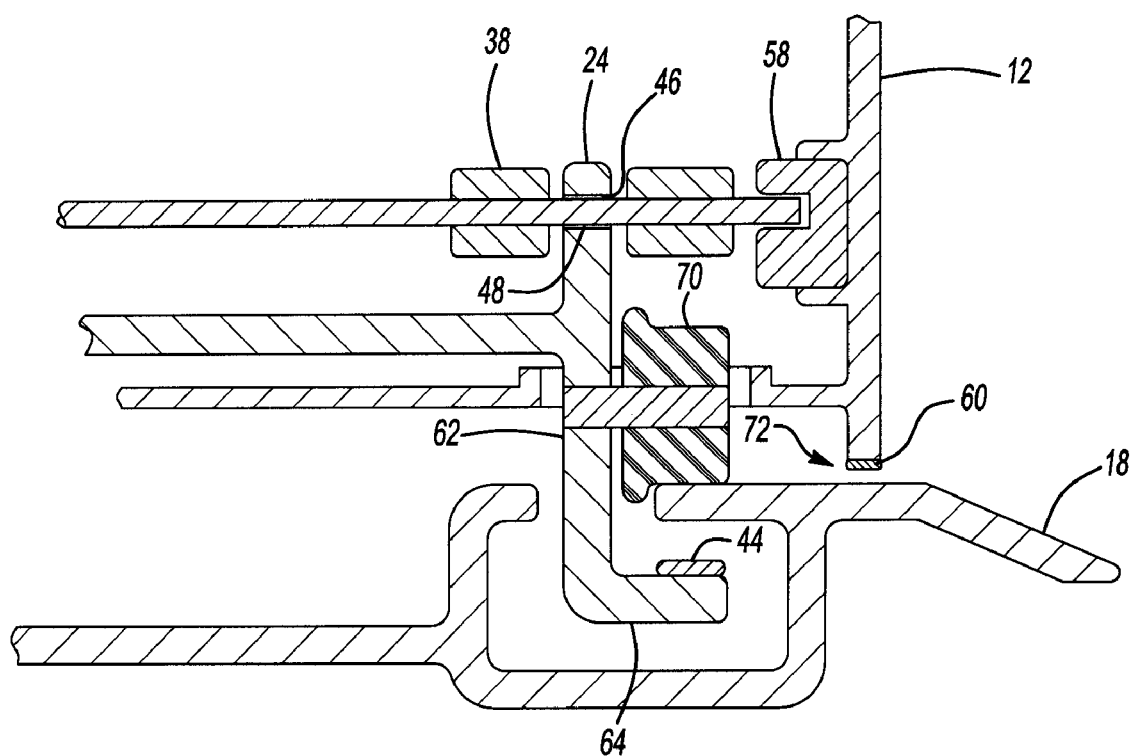

FIGS. 5*a*-5*b* illustrate a more detailed view of one clamp 24 of the locking mechanism 20 in an unlocked position in accordance with one non-limiting aspect of the present invention. The unlocked position generally corresponds with the clamp 24 dropping below the underside of the track 18 such that all or substantially all of the friction between the friction pad 44 and track 18 is removed, thereby permitting the console 12 to freely slide within the track 18.

The spring forces associated with the forward and rearward springs 34-36 may be surpassed in order to move the shuttle plate 38 leftwardly. The leftward movement of the shuttle plate 38 causes the shuttle pin 46 to travel within the lever clamp ramp 48 in such a manner as to force the lever clamp 24 to rotate in a downward direction, thereby dropping the friction pad 44 below the underside of the track 18.

The lever clamp 24 may further include a roller 70 configured to contact a top side of the track 18 with actuation of the shuttle plate 38. The roller 70 may be configured to roll along the topside of the track 18 so as to facilitate movement of the console 12. The shuttle ramp 48 and leftward movement of the shuttle plate 38 may be sufficient to press the roller 48 against the topside of the track 18 such that the roller 70 raises the console 12 to create a gap 72 between the bottom side of the console 12 and the topside of track 18. This may be helpful in facilitating movement of the console 12.

The foregoing is only one exemplary configuration for instigating the vertical movements of the lever clamp 24 and console 12. The present invention is not intended to be limited to this particular embodiment and fully contemplates the use of any number of other features to facilitate such movement. For example, the shuttle plate may be connect to the lever clamp by way of a cam, crank arm, or other feature suitable to actuated the lever clamp in the manner described above and without necessarily requiring movement of a pin or other element within the ramp, i.e., the ramp may be removed.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A storage console configured to slide within a track, the storage console comprising:

a lever clamp proximate a bottom side of the console, the lever clamp including a locked and unlocked position, the locked position corresponding with the lever clamp pressing against the track to create a friction brake, the unlocked position corresponding with removal of the friction brake; and wherein the friction brake prevents movement of the console within the track only up to a threshold amount of force applied to an end of the console, the console moving within the track if force above the threshold is applied.

2. The storage console of claim 1 further comprising a release mechanism configured to actuate the lever clamp from the locked to unlocked positions, the release mechanism associated with causing a pin to travel within a ramp of the lever clamp, the ramped travel of the pin being sufficient to remove the friction brake.

3. The storage console of claim 2 wherein the pin is associated with a shuttle plate configured to move longitudinally within side walls of the console and wherein the release mechanism is configured to move the shuttle plate longitudinally in such a manner as to cause the pin to travel to an unlocked position within the ramp that corresponds with the unlocked position of the lever clamp.

4. The storage console of claim 3 further comprising at least one spring configured to bias the shuttle plate in an opposite direction relative to a direction of movement imparted to the shuttle plate with the release mechanism such that the shuttle plate moves upon releasing the release mechanism in such a manner as to cause the pin to travel within the lever clamp to a locked position within the ramp that corresponds with the locked position of the lever clamp.

5. A storage console configured to slide within a track, the storage console comprising:
a lever clamp proximate a bottom side of the console, the lever clamp including a locked and unlocked position, the locked position corresponding with the lever clamp pressing against the track to create a friction brake sufficient to secure positioning of the console with respect to the track, the unlocked position corresponding with removal of the friction brake such that the console is free to slide relative to the track;
wherein the console rests against the track when the lever clamp is in the locked position and wherein the lever clamp raises the console above the track in the unlocked position.

6. The storage console of claim 5 wherein the lever clamp includes a roller that engages the track in the unlocked position so as to raise the console above the track and to facilitate movement of the console relative to the track.

7. The storage console of claim 1 wherein the lever clamp includes a pivot journaled at one end relative to a side wall of the console such that the lever clamp rotates about the pivot when moving between the unlocked and locked positions.

8. The storage console of claim 1 wherein the lever clamp includes a laterally extending portion relative to a vertically extending portion such that the laterally extending portion extends under the track and compresses against an underside of the track to generate the friction brake.

9. The storage console of claim 1 further comprising a friction pad connected to the lever clamp to facilitate generating the friction brake.

10. The storage console of claim 1 further comprising four locking mechanisms at four distal ends of the console, each locking mechanism configured to generate friction brakes with the track.

11. The storage console of claim 1 wherein the locking mechanism is hidden within the track and behind the console.

12. A storage console configured to slide within a track, the storage console comprising:
a clamp proximate a bottom side of the console, the clamp including a locked and unlocked position, the locked position corresponding with the clamp pressing against the track to create a friction brake sufficient to secure positioning of the console with respect to the track, the unlocked position corresponding with movement of the clamp below the track to remove the friction brake such that the console is free to slide relative to the track.

13. The storage console of claim 12 further comprising at least two clamps for receipt within parallel slots in the track, the parallel slots facilitating movement of the console within the track.

14. The storage console of claim 13 further comprising a shuttle plate configured to simultaneously lock and unlock the at least two clamps.

15. The storage console of claim 14 further comprising guide blocks in side walls of the track to facilitate longitudinal movement of the shuttle plate within the console.

16. The storage console of claim 12 further comprising a frictional pad connected to the clamp to facilitate generating the friction brake between the console and the clamp.

17. The storage console of claim 12 further comprising a frictional pad connected to a bottom side of the console to facilitate generating friction brake between the console and the track.

18. The storage console of claim 12 further comprising a roller configured to vertically raise the console with the vertical movement of the clamp so as to clear a bottom side of the console from a top side of the track and thereby facilitate movement of the console relative to the track.

19. The storage console of claim 12 wherein one end of the clamp is journaled to the console such that the clamp pivots about the journaled end in order to impart the vertical movement.

20. The storage console of claim 12 wherein the clamp includes a vertically extending portion for extending within a c-shaped portion of the track and a laterally extending portion extending from the vertically extending portion to extend beneath an underside of the c-shaped portion of the track, the clamp pressing upwardly against the underside of the track to provided the friction brake.

* * * * *